Figure 1:
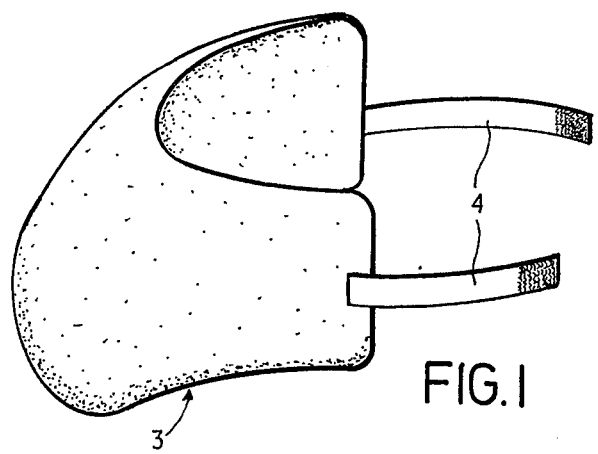

United States Patent [19]
Jelliffe

[11] 3,936,075
[45] Feb. 3, 1976

[54] MATERNITY PROTECTION DEVICE

[76] Inventor: Robin Stewart Jelliffe, 38 Gordon St., Coffs Harbour, N. S. W. 2450, Australia

[22] Filed: Mar. 4, 1974

[21] Appl. No.: 447,622

[30] Foreign Application Priority Data
Mar. 13, 1973 Australia.................... PB 2565/73

[52] U.S. Cl.................. 280/150 B; 2/2; 128/132 R
[51] Int. Cl.² ........................................ B60R 21/02
[58] Field of Search.............. 280/150 B, 150 SB; 128/132; 2/2, 3 R; 9/340, 342, 348

[56] References Cited
UNITED STATES PATENTS

| 525,710 | 9/1894 | Keogh..................................... 2/2 X |
| 2,249,966 | 7/1941 | Matthews................................... 2/2 |
| 2,569,742 | 10/1951 | Austin..................................... 9/340 |
| 3,162,861 | 12/1964 | Gustafson ................................. 2/2 |
| 3,174,798 | 3/1965 | Sprague.................... 280/150 SB X |
| 3,392,989 | 7/1968 | Graham....................... 280/150 B |
| 3,577,562 | 5/1971 | Holt....................................... 2/3 R |
| 3,690,696 | 9/1972 | Lincoln ......................... 280/150 SB |
| 3,713,695 | 1/1973 | Von Wimmersperg .. 280/150 B UX |

FOREIGN PATENTS OR APPLICATIONS
928,600   6/1963   United Kingdom......................... 2/2

Primary Examiner—M. Henson Wood, Jr.
Assistant Examiner—Michael J. Forman
Attorney, Agent, or Firm—Ladas, Parry, Von Gehr, Goldsmith & Deschamps

[57] ABSTRACT

The present invention relates to a device for protecting pregnant women drivers or passengers from injury to the abdomen during sudden or unexpected braking of a moving vehicle. The device in one form is a dome shaped shield of rigid plastics material, which is adapted to fit over the protuberant abdomen.

1 Claim, 2 Drawing Figures

U.S. Patent  February 3, 1976  3,936,075

MATERNITY PROTECTION DEVICE

The present invention relates to protective devices, and more particularly to a means of protecting pregnant women drivers or passengers during sudden or unexpected braking of a moving vehicle.

Pregnant women be they drivers or passengers of a vehicle are relatively vulnerable to injury whilst using conventional safety belts when they are subjected to sudden or unexpected braking especially in road traffic accidents. In the latter stages of pregnancy, a woman driver is sitting with a large soft uterus in her lap, which is totally unsuited to withstand a direct violent impact. If a safety belt is not worn in a road traffic accident, the woman is in great danger of sustaining an injury, say from the steering wheel. While, if she wears a safety belt, a sudden deceleration force will cause the relatively narrow belts to cut into the uterine wall, with a real risk of either an immediate or delayed rupturing of the uterus, and consequential damage to both the mother and child.

An object of the present invention is to provide a means of substantially reducing the risk to the mother and the unborn child in an accident.

The invention in one general form is a device for protecting the protuberant abdomen of a pregnant woman while in a posture for movement in a vehicle, the device comprising shielding means, which is sized, shaped and adapted to fit over the protuberant abdomen.

Figure 2:
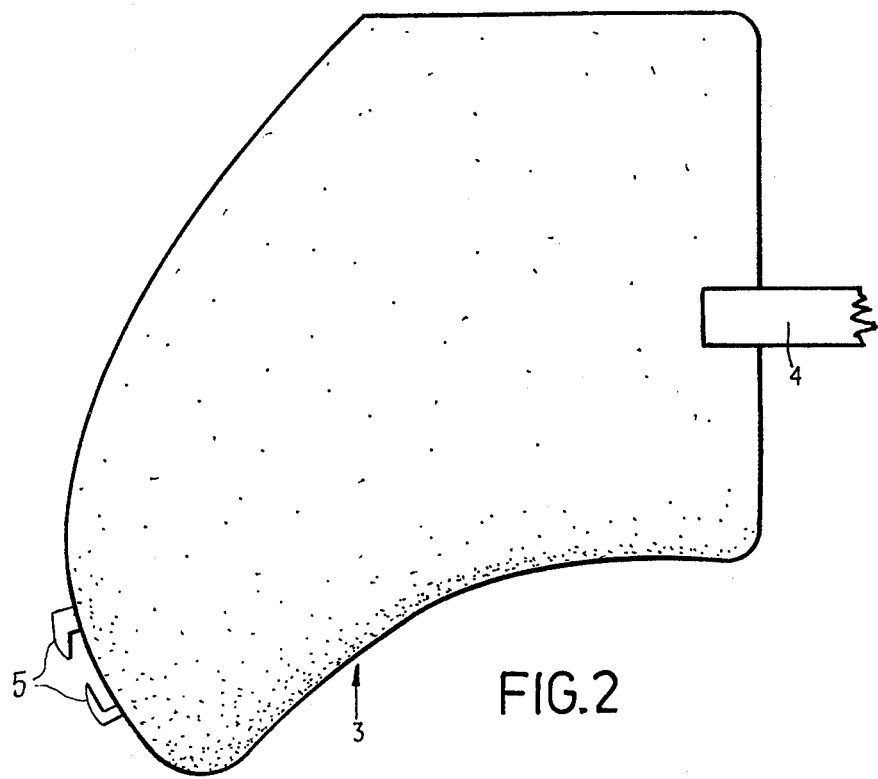

A preferred embodiment of the invention will now be described by way of example with reference to the accompanying drawings, wherein:

FIG. 1 is a perspective view of a protector device according to the present invention; and FIG. 2 is a side elevation of the protector device.

The protector device 3 as illustrated in FIGS. 1 and 2, is formed to correspond with the actual shape of an abdomen of a pregnant woman, when sitting in a driving position. The shape is complex and very "droopy". A plaster cast of the abdomen of a pregnant woman is taken from below the rib cage to above the groin, to reproduce the shape, and from which a dome is made. The dome is fabricated in a rigid material, such as high impact fibre-glass or other suitable material. The edges of the protective dome are trimmed with protective rubber U-shaped strips and the concave or inner surface of the dome is lined and padded with a soft material, such as foam rubber or plastic. An adjustable webbing belt 4 may be provided if required, the belt being attached to the sides of the dome. In use the belt 4 is passed around the woman and fastened with a side buckle to secure the protector device in position to cover the front of the abdomen.

When conventional safety belts are worn in conjunction with a protector device according to the present invention, the safety belts lie across the dome covering the abdomen. In this instance the adjustable securing belt 4 of the protector is not essential as the safety belts will hold the protector in position.

Lugs 5 (shown in FIG. 2 but not in FIG. 1) may be fitted on the convex or outside surface of the dome, into which the existing car safety belt may be slotted to prevent their sliding off on an impact. A plurality of dome sizes may be provided to fit different sizes of person.

What I claim is:

1. A device for protecting the protuberant abdomen of a pregnant woman, the device comprising a substantially rigid dome, and lugs located on and secured to an outside surface of the dome, said dome being shaped to correspond substantially with the shape of the protuberant abdomen of the pregnant woman in a sitting posture in a vehicle and being sized to fit over and cover the protuberant abdomen, said dome being capable of being fitted between a conventional vehicle safety belt and the protuberant abdomen such that in use the safety belt lies across the dome and thereby holds the device in position, and the lugs being adapted to permit the vehicle safety belt to be held therein, thereby preventing the safety belt from slipping off the dome.

* * * * *